(12) United States Patent
Sako et al.

(10) Patent No.: US 7,928,674 B2
(45) Date of Patent: Apr. 19, 2011

(54) MOTOR SPEED CONTROL SYSTEMS

(75) Inventors: Masahiko Sako, Anjo (JP); Mayumi Nagai, Anjo (JP)

(73) Assignee: Makita Corporation, Anjo-shi (JP)

( * ) Notice: Subject to any disclaimer, the term of this patent is extended or adjusted under 35 U.S.C. 154(b) by 511 days.

(21) Appl. No.: 11/716,600

(22) Filed: Mar. 12, 2007

(65) Prior Publication Data

US 2007/0216326 A1   Sep. 20, 2007

(30) Foreign Application Priority Data

Mar. 15, 2006   (JP) ................................. 2006-070792

(51) Int. Cl.
   *H02P 7/00*   (2006.01)
(52) U.S. Cl. ........ 318/268; 318/625; 318/563; 318/565; 388/811
(58) Field of Classification Search .................. 318/268, 318/625, 562, 565; 388/811
   See application file for complete search history.

(56) References Cited

U.S. PATENT DOCUMENTS

| | | | | |
|---|---|---|---|---|
| 4,430,612 A | * | 2/1984 | Onitsuka et al. | 324/166 |
| 4,623,827 A | * | 11/1986 | Ito | 388/811 |
| 4,656,401 A | * | 4/1987 | Ninomiya et al. | 388/813 |
| 5,130,626 A | * | 7/1992 | Kajitani et al. | 318/608 |
| 5,187,420 A | * | 2/1993 | Kajitani et al. | 318/823 |
| 5,325,460 A | * | 6/1994 | Yamada et al. | 388/811 |
| 5,552,685 A | * | 9/1996 | Young et al. | 318/400.32 |
| 5,604,648 A | * | 2/1997 | Oh | 360/73.11 |
| 5,718,097 A | * | 2/1998 | Kinoshita et al. | 53/75 |
| 5,828,014 A | | 10/1998 | Goto et al. | |
| 6,049,182 A | * | 4/2000 | Nakatani et al. | 318/432 |
| 6,384,561 B1 | * | 5/2002 | Niizuma et al. | 318/625 |
| 6,713,983 B2 | * | 3/2004 | Maruyama | 318/560 |
| 7,141,945 B2 | * | 11/2006 | Harada | 318/400.17 |
| 7,245,100 B2 | * | 7/2007 | Takahashi | 318/560 |

FOREIGN PATENT DOCUMENTS

| | | |
|---|---|---|
| EP | 0 354 095 A1 | 2/1990 |
| JP | A-63-213485 | 9/1988 |
| JP | A 63-213485 | 9/1988 |
| WO | WO 01/90472 A2 | 11/2001 |

* cited by examiner

*Primary Examiner* — Walter Benson
*Assistant Examiner* — David S Luo
(74) *Attorney, Agent, or Firm* — Oliff & Berridge, PLC

(57) ABSTRACT

A motor speed control system includes a pulse outputting device capable of outputting a pulse each time a motor rotates, a pulse interval determining device capable of determining a pulse interval between the pulses outputted, and a comparative value calculating device capable of obtaining a comparative value as the product of a first value and a second value. The first value can correspond to the pulse interval determined, and the second value can correspond to a set rotational speed of the motor. The system can further include a set value calculating device capable of obtaining a set value as the product of the second value and a third value and a controller capable of controlling a supply of power to the motor such that a difference between the set value and the comparative value decreases.

14 Claims, 6 Drawing Sheets

MOTOR SPEED CONTROL SYSTEMS

This application claims priority to Japanese patent application serial number 2006-70792, the contents of which are incorporated herein by reference.

BACKGROUND OF THE INVENTION

1. Field of the Invention

The present invention relates to control systems for controlling motor speed.

2. Description of the Related Art

A known motor speed control system is shown in FIG. 7 and generally includes an encoder 102 for detecting the rotational speed of a motor 101, a frequency/voltage converter 103 for converting an output signal from the encoder 102 into a voltage signal V that represents the rotational speed, and a setting unit 104 that can output voltage signal Vs corresponding to a set value of the rotational speed.

The encoder 102 is configured to output a pulse generation signal at each time that the motor 101 has rotated by a predetermined angle. The frequency/voltage converter 103 generates a pulse having a pulse width at each time that the pulse generation signal is produced at the encoder 102. Therefore, the frequency/voltage converter 103 produces a series of pulses. The converter 103 includes a smoothing circuit that converts a series of pulses into a voltage value corresponding to the pulse density. Thus, as the rotational speed of the motor 101 increases or decreases, the pulse density may be increased or decreased. Therefore, the voltage signal V after being smoothed by the smoothing circuit varies in proportion to the rotational speed of the motor 101.

Then, a comparator 105 compares the voltage signal V (i.e., the output signal from the frequency/voltage converter 103) corresponding to the rotational speed of the motor 101 with the voltage signal Vs corresponding to the set rotational speed of the motor 101. Subsequently, a controller 106 controls the supply of power to the motor 101 such that the difference (Vs−V) between the voltage signal V and the voltage signal Vs is decreased.

However, because the frequency/voltage converter 103 of the known system 100 converts a series of pulses into the voltage corresponding to the pulse density by means of the smoothing circuit, delay in transmission of signal may occur due to the smoothing circuit. Therefore, it is necessary to provide additional circuit for compensating for the delay in phase caused by the smoothing circuit, resulting in increase of the cost of the control system 100. In addition, even if the compensation has been made, it is likely that the usable speed range is limited. Further, even if a small-bit low cost microcomputer (such as 8-bit to 16-bit microcomputers) is included for digitalizing the analogue value, it is difficult to obtain a voltage signal V in a desired accuracy from the smoothing circuit.

In order to solve this problem, Japanese laid-Open Patent Publication No. 63-213485 has proposed to control the rotational speed of the motor without using the smoothing circuit. A speed control system disclosed in this publication is shown in FIG. 6(A) and is labeled with reference numeral 120. According to this speed control system 120, a time T between pulse signals (i.e., a pulse interval T) from the encoder 102 is determined by a timer counter 123. Then, a count value C corresponding to the determined pulse interval T is compared with a count value C3 corresponding to a pulse interval Ts (i.e., a set value Ts), and subsequently, a controller 106 controls the power supplied to the motor 101 such that a difference (Cs−C) decreases.

Here, the pulse interval T decreases as the rotational speed of the motor 101 increases, and the pulse interval T increases as the rotational speed of the motor 101 decreases. Thus, the pulse interval T is inversely proportional to the rotational speed of the motor 101. Because the speed control of the motor 101 is performed using the count value C corresponding to the pulse interval T as it is, without using the inverse number of the pulse interval, it is possible to use a small-bit microcomputer.

However, according to the speed control system 120, a timer counter 123 counts the pulse interval T of the pulse signals from the encoder 102 based on a fixed oscillating frequency t. For example, if the motor 101 rotates at a speed of 100 rps, and the encoder 102 generates one pulse per revolution, a pulse interval T1 in this case is calculated to be $\frac{1}{100}$ (seconds) (T1=$\frac{1}{100}$). Therefore, if the timer counter 123 counts using a time interval t (t=16 μs/count), the count value C of the timer counter 123 is calculated to be 625 (C=T1/t). On the other hand, if the motor 101 rotates at a high speed, for example at a speed of 650 rps, a pulse interval T2 in this case is calculated to be $\frac{1}{650}$ (seconds) (T2=$\frac{1}{650}$), and the count value C of the timer counter 123 is calculated to be 96 counts (C=T2/t). Then, the count value C of the timer counter 123 is compared with the count value Cs corresponding to the set value Ts (Cs=Ts/t).

In the case that the set rotational speed Ns of the motor 101 has been decreased by 4% when the rotational speed N of the motor 101 is high (N=650 rps, C=96 counts), the set rotational speed Ns is 624 rps (Ns=N−0.04N=650−0.04*650=624). If the set rotational speed Ns is 624 rps, the set value Ts is $\frac{1}{624}$ (seconds), and the counted value Cs of the counter C (C=Ts/t) is 100. Thus, the difference between (Cs−C) is calculated as "(Cs−C)=(Ts/T)−(Ts/t)=100−96=4."

On the other hand, in the case that the set rotational speed Ns of the motor 101 has been decreased by 4% when the rotational speed N of the motor 101 is low (N=100 rps, C=625 counts), the set rotational speed Ns is 96 rps (Ns=N−0.04N=100−0.04*100=96). If the set rotational speed Ns is 96 rps, the set value Ts is $\frac{1}{96}$ (seconds), and the counted value Cs of the counter C (C=Ts/t) is 651. Thus, the difference between (Cs−C) is calculated as "(Cs−C)=(Ts/T)−(Ts/t)=651−625=26."

Therefore, although the reduction ratio or the deviation ratio is 4% both in the cases of the high rotation and the low rotation of the motor 120, the difference in counts (Cs−C) is largely different between the cases of the high rotation and the low rotation. Thus, even if the deviation ratio is the same, the difference in counts (Cs−C) is large in the case of the low speed operation while the difference is small in the case of the high speed operation. Therefore, it is not possible to properly accurately perform the control over the low speed operation and the high speed operation.

Thus, there is a need in the art for a motor speed control systems that can properly perform a motor speed control with the same accuracy over the low speed rotation and the high speed rotation.

SUMMARY OF THE INVENTION

One aspect according to the present invention includes a motor speed control system having a pulse outputting device, a pulse interval determining device, a comparative value calculating device, a set value calculating device and a controller. The pulse outputting device outputs a pulse at each dime a motor rotates by a predetermined angle. The pulse interval determining device determines a pulse interval between the pulses outputted from the pulse outputting device. The comparative value calculating device obtains a comparative value as the product of a first value and a second value. The first value corresponds to the pulse interval determined by the pulse interval determining device. The second value corresponds to a set rotational speed of the motor. The set value calculating device obtains a set value as the product of a third value and the second value. The third value corresponds to the pulse interval obtained when the motor rotates at the set rotational speed. The controller controls a supply of power to the motor such that a difference between the set value and the comparative value decreases.

As described above, the comparative value calculating device obtains the comparative value as the product of the first value corresponding to the pulse interval determined by the pulse interval determining device and the second value corresponds to the set rotational speed of the motor. Here, the first value is proportional to the inverse number of the rotational speed, i.e., the actual rotational speed N. The inverse number can be expressed as 1/N (N: actual rotational speed). Therefore, the first value decreases as the actual rotational speed N increases, and the first value increases as the actual rotational speed N decreases. The second value can be expressed as K*Ns (Ns: set rotational speed of the motor, K: constant value). Therefore, the comparative value can be expressed as "K*Ns*(1/N)=K*(Ns/N)."

The set value calculating device obtains the set value as the product of the second value (K*Ns) and the third value. The third value corresponds to the pulse interval obtained when the motor rotates at the set rotational speed and the third value is proportional to 1/Ns. Therefore, the set value can be expressed as "K*Ns*(1/Ns)=K." As a result, the set value does not change even if the set rotational speed Ns has been changed over a range between the low speed and the high speed.

Because the comparative value is expressed as "K*(Ns/N), the comparative value is equal to the set value K if the actual rotational speed N is the same as the set rotational speed Ns. Therefore, the difference between the comparative value and the set value becomes zero.

For example, if the set rotational speed Ns has been lowered by 4% when the motor rotates at the actual rotational speed N, the resulted rotational speed Ns is calculated as "Ns=N−0.04 N=0.96*N. Therefore, the comparative value K is calculated as "K*(Ns/N)=0.96*K." On the contrary, if the set rotational speed Ns has been increased by 4%, the resulted set rotational speed Ns is calculated as "Ns=N+ 0.04N=1.04*N. Therefore, the comparative value K is calculated as "K*(Ns/N)=1.04*K.

In this way, the comparative value changes with change of the speed change ratio but does not always change with the rotational speed of the motor. Thus, if the speed change ratio is the same, the comparative value will not be changed in either the case that the set rotational speed has been changed when the motor rotates at a low speed or the case that the set rotational speed has been changed when the motor rotates at a high speed. Thus, if the speed change ratio is the same, the difference between the comparative value and the set value is the same. Then, the controller adjusts the supply of power to the motor in order to decrease the difference.

In summary, the value that corresponds to the pulse interval determined by the pulse interval determining device and that is proportional to 1/N is directly used for control. No calculation is made to calculate the rotational speed of the motor from the inverse number of the pulse interval. Therefore, it is possible to use a small-bit microcomputer, such as 8-bit to 16 bit microcomputers, in order to control the motor speed.

In addition, because the set value K is constant independent of the change of the set rotational speed over a range between the low speed and the high speed, it is possible to perform a control like a constant value control. Further, the difference between the comparative value and the set value has a fixed value as long as the speed change ratio does not change. Therefore, it is possible to properly perform the speed control device with the same accuracy over the range between the high speed rotation and the low speed rotation.

In another embodiment, the motor speed control system further includes an operation device that is operable to continuously change the fourth value.

Another aspect of the present invention includes a motor speed control system having a controller operable to increase or decrease a power supply to a motor. The controller increases the supply of power when a difference in E is a negative value, the difference in E is calculated by "E=K(1− Ns/N)". Here, K is a constant value, Ns is a set rotational speed, and N is an actual rotational speed. Further, controller decreases the supply of power when the difference in E is a positive value.

The motor speed control system can further include a comparative value calculating device for calculating a comparative value D by "D=Nsc*C." Here, Nsc is a digital value representing set rotational speed Ns, and C is an integer number representing the actual rotational speed N. The motor speed control system can further include a set value calculating device for calculating a set value as the constant value K by "K=Nsc*Cs." Here, Cs is an integer number representing the set rotational speed Ns. The difference in E is calculated by "E=K−D=Nsc*Cs−Nsc*C."

DETAILED DESCRIPTION OF THE INVENTION

Each of the additional features and teachings disclosed above and below may be utilized separately or in conjunction with other features and teachings to provide improved motor speed control systems. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

An embodiment according to the present invention will now be described with reference to FIGS. 1 to 5.

Figure 1:
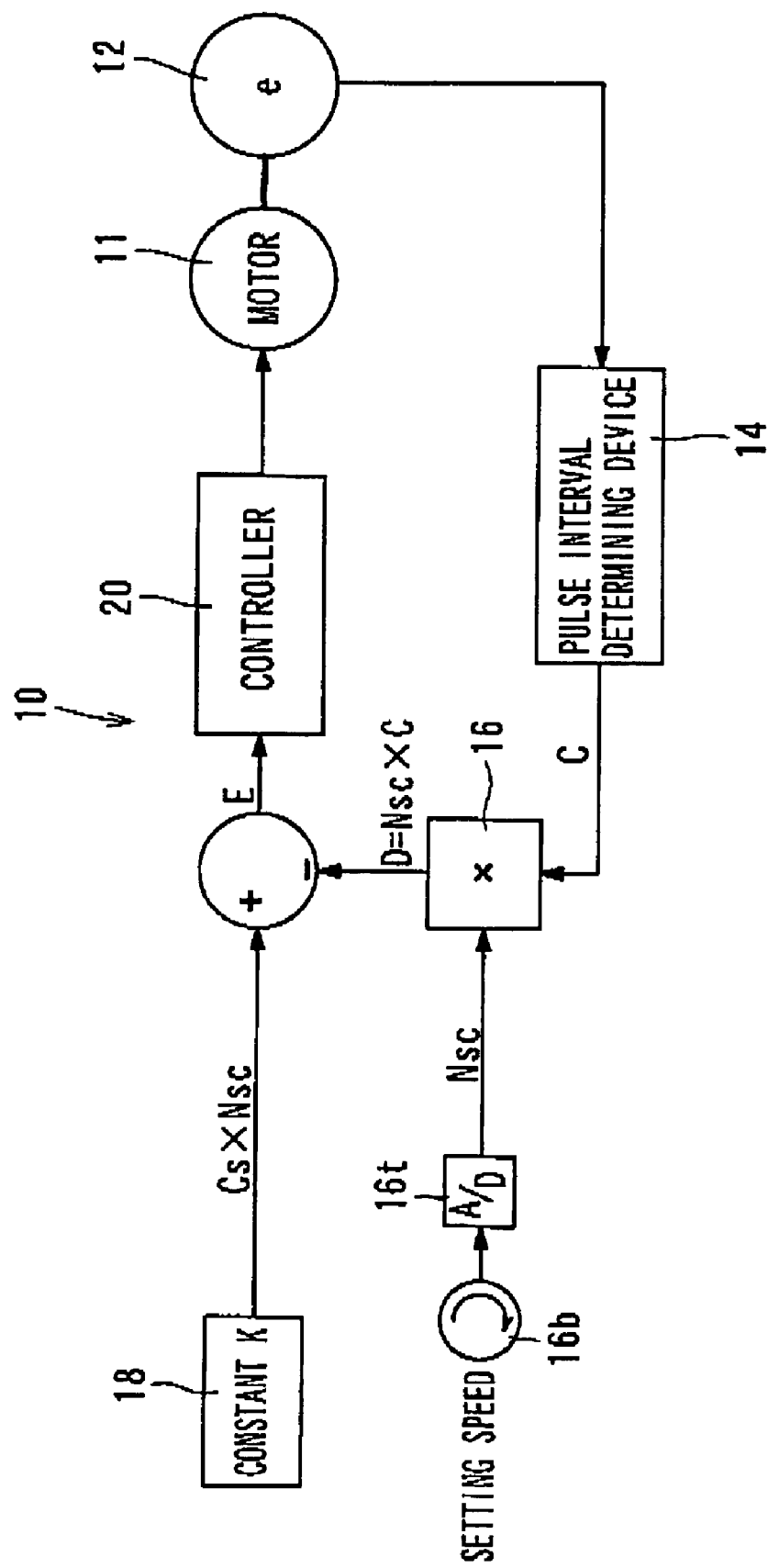
FIG. 1 is a block diagram showing a representative motor speed control system according to the present invention.

As shown in FIG. 1, a representative motor speed control system 10 can include an encoder 12, a pulse interval determining device 14, a calculating device for a comparative value, a setting device 18 and a controller 20.

Figure 5:
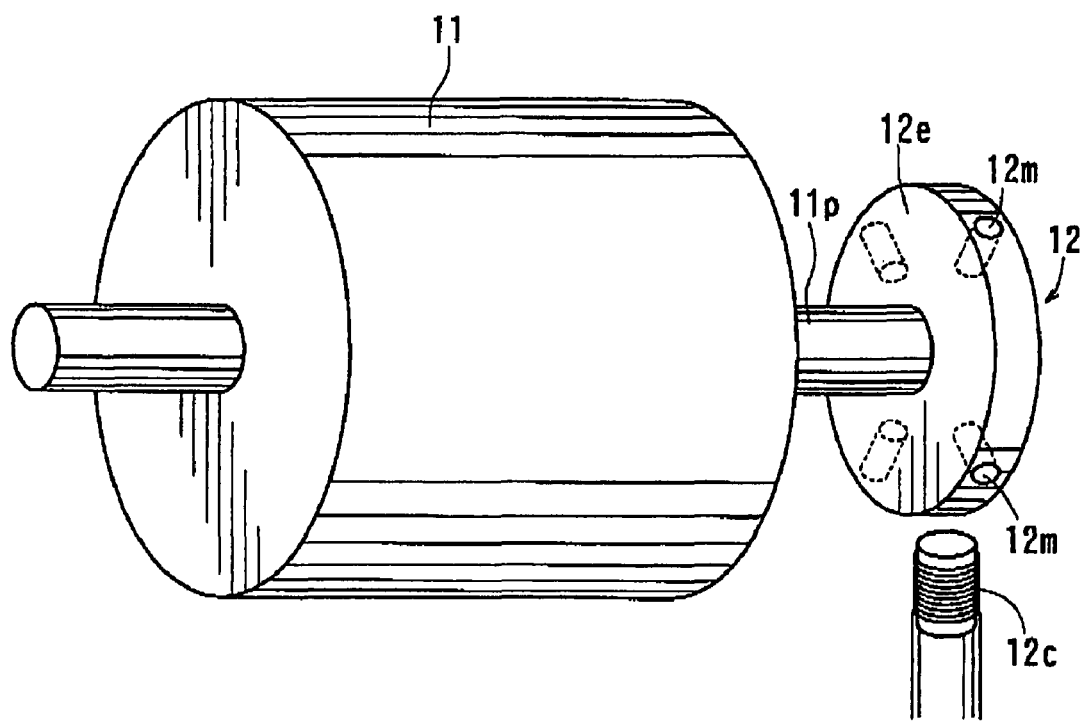
FIG. 5 is a schematic perspective view of an encoder.
Figure 6:
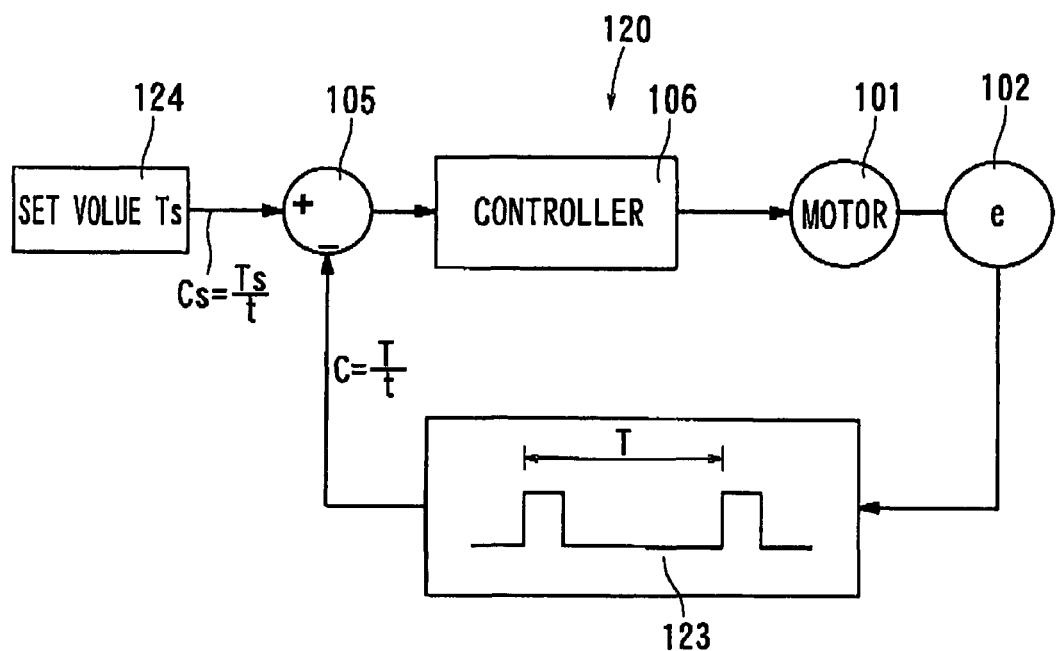
FIG. 6(A) is a schematic block diagram of a known motor speed control system.
FIG. 6(B) is a schematic view illustrating how a pulse interval is determined by the known system.
Figure 6:
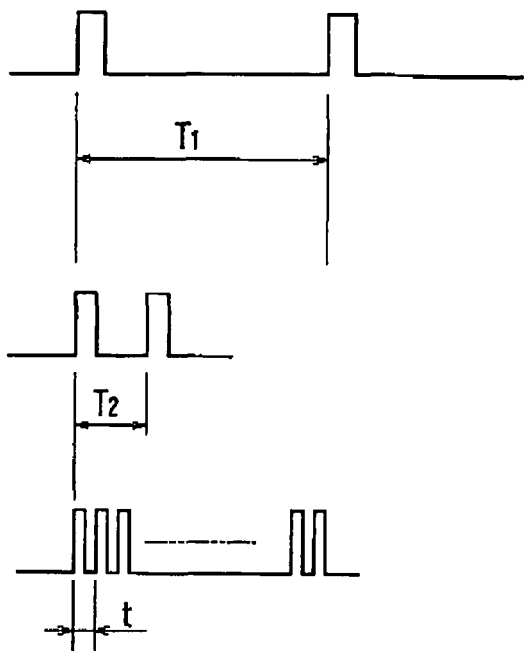
Figure 7:
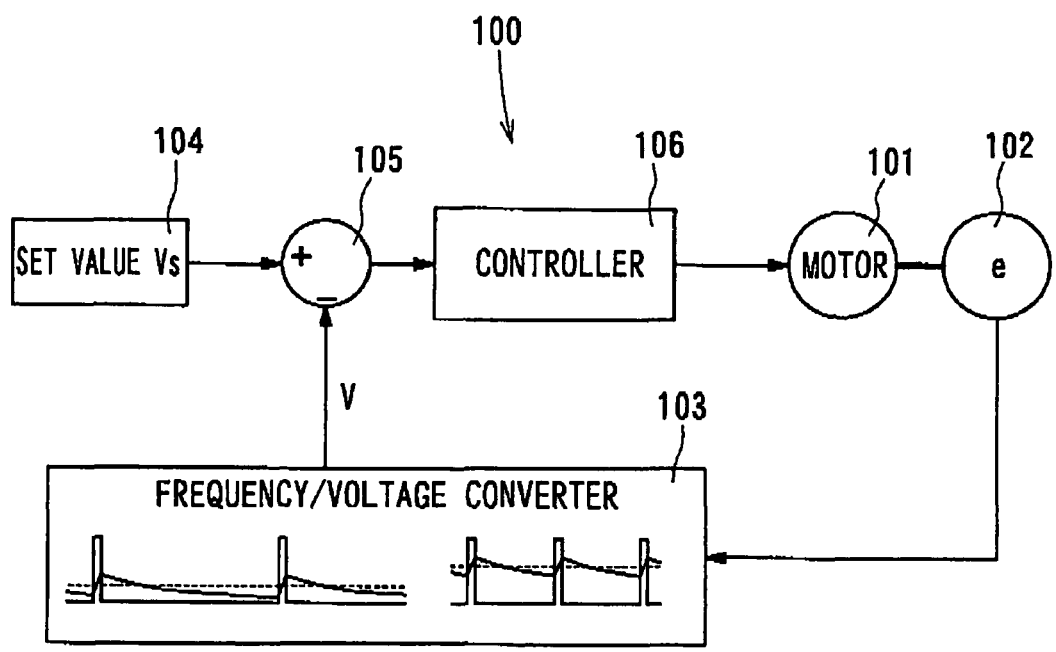
FIG. 7 is a block diagram of another known control system.

As schematically shown in FIG. 5, the encoder 12 includes a disk 12e that rotates with a rotational shaft 11b of a motor 11, a plurality of magnets 12m embedded into the outer peripheral surface of the disk 12e, and a pick-up coil 12c that is disposed proximally to the outer peripheral surface of the disk 12e in order to detect the magnetic fluxes of the magnets 12m. The magnets 12m are spaced equally from each other in the circumferential direction of the disk 12e and are arranged such that either of the magnets 12m passes through a position proximally to the pick-up coil 12c as the motor 11 rotates at a predetermined angle. As each magnet 12m passes through the position proximally to the pick-up coil 12c, a voltage is produced at the pick-up coil 12c by the electromagnetic induction. In other words, a voltage is produced at the pick-up coil 12c at each time the motor 11 has rotated by the predetermined angle, so that the encoder 12 outputs a pulse signal based on the voltage produced at the pick-up coil 12c. In this way, the encoder 12 serves as a pulse signal generating device.

As described above, a pulse is outputted each time the motor 11 has rotates. The time interval between two successive pulses (hereinafter called pulse interval 1) decreases as the rotational speed of the motor 11 increases. On the other hand, the pulse interval T increases as the rotational speed of the motor 11 decreases.

Referring to FIG. 1, the pulse interval determining device 14 determines a pulse interval T of the pulse signal generated by the encoder 12. The pulse interval determining device 14 includes a timer counter that is operable to count a number of predetermined oscillation periods t from the start of each pulse to the start of the next pulse in order to obtain a count number C. Then, the pulse interval T is calculated, because the count number C and the pulse interval T have the relation expressed as "C=T/t." Therefore, the count number C is a value that represents the pulse interval T. In this embodiment, the oscillation period t of the timer counter is set to be 16 μs.

The calculating device 16 calculates a comparative value D by multiplying the count number C for the pulse interval T by a value Nsc that represents the set rotational speed Ns of the motor 11.

In this embodiment, the set rotational speed Ns of the motor 11 is variable within a range between 0 to 100% by the operation of a volume resistor 16b. For example, in this embodiment, the set rotational speed Ns is zero rps (Ns=0) when the volume resistor 16b is adjusted to 0%. The set rotational speed Ns is 510 rps (Ns=510) when the volume resistor 16b is adjusted to 100%. In order to obtain the value Nsc, the output signal from the volume resistor 16b, which is an analogue signal, is converted into a digital signal by an A/D converter 16t that may be a 8-bit A/D converter. Therefore, in the case that the set rotational speed is zero rps (Ns=0) and the volume resistor 16b is adjusted to 0%, the value Nsc that is an output from the A/D converter 16t is zero. In the case that the set rotational speed is 510 rps (Ns=510) and the volume resistor 16b is adjusted to 100%, the value Nsc or the output value from the A/D converter 16t is 255 (=$2^8$-1). Thus, the value Nsc can be calculated by the expression "Nsc=(355/510)*Ns=0.5Ns."

Therefore, the comparative value D is obtained by the expression "D=NSc*C. The volume resistor 16b may serve as an operation device for varying the set rotational speed Ns.

The setting device 18 serves to calculate a set value K that is obtained by multiplying the pulse interval Ts that may result when the motor 11 rotates at the set rotational speed Ns, by the value Nsc corresponding to the set rotational speed Ns of the motor 11.

Here, the pulse interval Ts that may result when the motor 11 rotates at a set rotational speed Ns is obtained by the expression "Ts=(1/Ns)/e (seconds)." The value e is the number of pulses that is generated by the encoder 12 during one revolution of the motor 11. In order to simplify the explanation, the description will be made on the assumption that value e is 1 (e=1).

If the value e is 1, the count number C of the timer counter when the motor 11 rotates at the set rotational speed Ns is calculated by the expression "Cs=Ts/t=(I/Ns)/t (counts)." As described previously, the A/D converted value Nsc corresponding to the set rotational speed Ns is calculated by the expression "Nsc=05*Ns." In addition, the set value K is obtained by multiplying the count number Cs of the pulse interval (when the motor 11 rotates at the set rotational speed Ns) by the A/D converted value Nsc corresponding to the set rotational speed Ns. Thus, the set value K is calculated by the expression "K=Cs*Nsc."

Therefore, in this example, K is calculated as "K=Cs*Nsc= ((1/Ns)/t)*0.5*Ns=0.5/t". Because the oscillation period t is set to be 16 μs in this embodiment, the set value K is calculated to be 31250. Thus, independently of the change of the set rotational speed Ns over the range between the high speed and the low speed by the operation of the volume resistor 16, the set value K is kept to be a fixed value of 31250.

As described previously, the comparative value D is calculated at the comparative value calculating device 16 by multiplying the D converted value Nsc corresponding to the set rotational speed Ns by the count number C. Thus, D is calculated as "D=Nsc*C". If an actual rotational speed of the motor 11 is represented by "N", the count number C is given by the expression "C=(1/N)/t." Using these expressions, the expression "D=Nsc*C" is modified as "D=Nsc*C=0.5*Ns*((1/N)/t)=(0.5/t)*(Ns/N)=K*(Ns/N)."

If the actual rotational speed N of the motor 11 is the same as the set rotational speed Ns, "Ns/N" in the above modified expression has a value of 1 (Ns/N=1). As a result, the comparative value D is equal to the set value K (D=K=31250). Therefore, a difference FD between the set value K and the comparative value D becomes zero (E=K−D=0).

If the actual rotational speed N of the motor 11 is higher than the set rotational speed Ns, "Ns/N" is smaller than 1 (Ns/N<1). Therefore, the comparative value D is smaller than K, so that the difference E has a positive value. Contrarily, if the actual rotational speed N of the motor 11 is lower than the set rotational speed Ns, "Ns/N" is greater than 1 (Ns/N>1). Therefore, the comparative valued D is greater than K, so that the difference E has a negative value.

In this way, the comparative value D is proportional to the ratio of the set rotational speed Ns to the actual rotational speed N (Ns/N). Therefore, if a change ΔN has been caused from the actual rotational speed N of the motor 11, resulting a change ΔD in the comparative value D, such a change ΔD will not vary in response to the actual rotational speed N of the motor 11.

Figure 2:
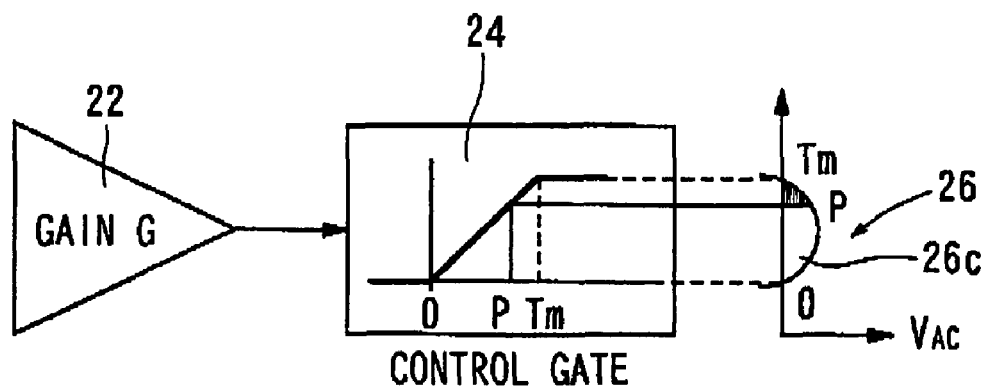
FIG. 2 is a schematic diagram of a controller.
Figure 3:
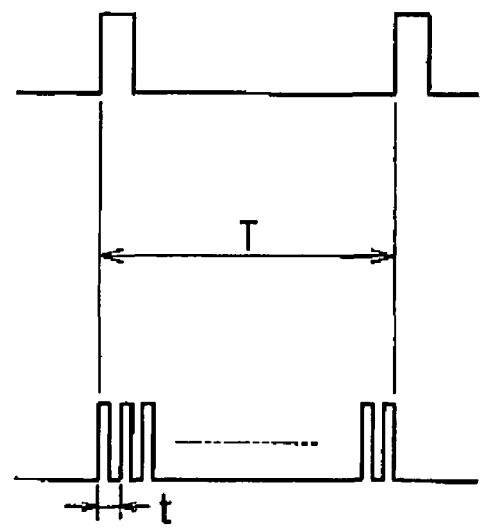
FIG. 3 is an explanatory view illustrating the principle of operation of a pulse interval determining device.
Figure 4:
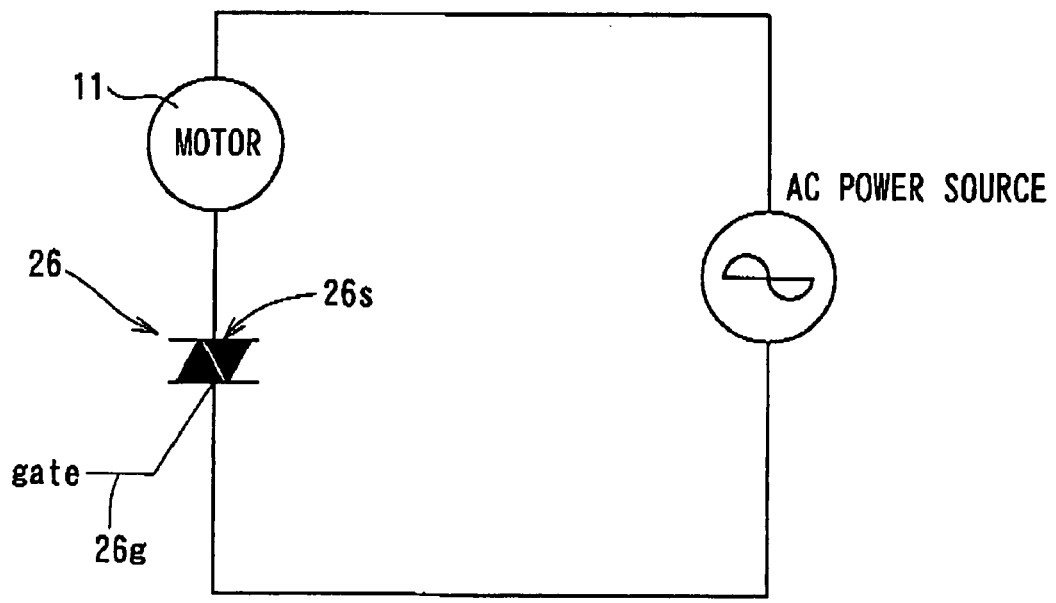
FIG. 4(A) is a schematic circuit diagram of a motor drive circuit.
FIG. 4(B) is an explanatory view illustrating a gate pulse adjuster.
Figure 4:
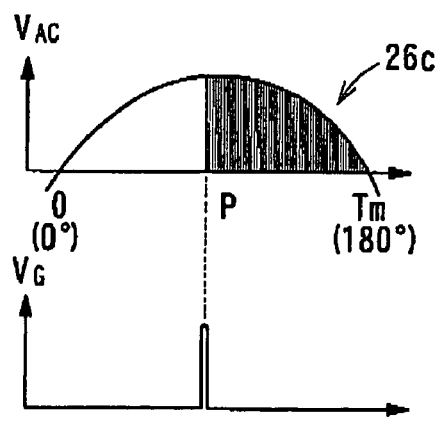

The controller 20 adjusts the power to be supplied to the motor 11 in order to reduce the difference E between the set value K and the comparative value D. As schematically shown in FIG. 2, the controller 20 can include an amplifier 22, a control gate 24 and a motor driver 26. The amplifier 22 amplifies the difference E. The control gate 24 restricts the output from the amplifier 22 and then outputs a resulted signal P to the motor driver 26. In this embodiment if the output from the amplifier 22 is zero or less, the control gate 24 controls the resulted signal P to have a minimum set value 0. In addition, if the output from the amplifier 22 exceeds a maximum set value Tm, the control gate 24 controls the resulted signal P to have the maxim set value Tm. Therefore, the output signal P from the control gate 24 may vary linearly between the minimum set value 0 and the maximum set value Tm.

The motor driver 26 drives the motor 11 based on the output signal P from the control gate 24. More specifically, as shown in FIGS. 4(A) and 4(B), the motor driver 26 includes a switching element 26s and a gate pulse adjuster 26c. The gate pulse adjuster 26c adjusts the input timing of gate pulses into the switching element 26s based on the output signal P from the control gate 24.

In this representative embodiment, a triac that is a bi-directional thyristor is used as the switching element 26s. As shown in FIG. 4(A), the switching element 26s is connected in series with the motor 11 (a series-wound motor in this representative embodiment) and an AC power source S. Therefore, the power source voltage is supplied to the motor 11 when the switching element 26s is in a conductive condition, while no power source voltage is supplied to the motor 11 when the switching element 26s is in a non-conductive condition.

The output signal P of the control gate 24 (having a value between 0 and Tm) corresponds to the waveform of the power source voltage of the AC power source S within a range between 0° phase and 180° phase as shown in FIG. 4(B). Also, the output signal P corresponds to the wave form of the power source voltage of the AC power source S within a range between 180° phase and 360° phase in the same manner as the range between 0° phase and 180° phase. Because the control for the range between 180° phase and 360° phase is performed in the same manner as the control for the range between 0° phase and 180°, the control will be described only for the range between 0° phase and 180° phase.

Within a range between 0 phase and 180° phase, the gate pulse adjuster 26c outputs gate pulses to a gate 26g of the switching element 26s based on the output signal P (having a value between 0 and Tm) of the control gate 24. More specifically, if the output signal P has a minimum value or the value of 0, the gate pulse adjuster 26c outputs a gate pulse at a time of the 0° phase of the waveform of the power source voltage. Therefore, the switching element 26s is in a conductive state between the 0° phase and 180° phase of the waveform, so that a maximum conduction period results and the power of the motor 11 maximizes.

In the case that the output signal P has a value of ½ Tm, the gate pulse adjuster 26c outputs a gate pulse at a time of the 90° phase of the waveform of the power source voltage. Therefore, the switching element 26s is in a conductive state between the 90° phase and 180° phase. As a result, the conduction period becomes half the maximum conductive period and the power of the motor 11 becomes half the maximum power.

In the case that the output signal P has a value of Tm (maximum value), the gate pulse adjuster 26c outputs a gate pulse at a time of the 180° phase of the waveform of the power source voltage. In that case, the switching element 26s is not brought to a conductive state and the power of the motor 11 becomes zero.

When the load applied to the motor 11 has increased to cause decrease in the actual rotational speed N from the set rotational speed Ns during the operation of the power tool having the representative speed control system 10, the relation "D (comparative value)=K*(Ns/N)>K" will result. This causes the difference E to have a negative value, so that the control gate 24 of the controller 20 processes the output signal P to have the minimum value of 0. Then, the gate pulse adjuster 26c of the motor driver 26 outputs the gate pulse to the gate 26b at a time of the 0° phase of the waveform of the power source voltage. Therefore, the switching element 26s is in the conductive state during the period between the 0° phase and the 180° phase of the waveform of the power source voltage. As a result, the power of the motor 11 has a maximum value. In other words, the motor 11 is controlled to increase the speed from the actual speed N.

When the actual rotational speed N has increased to exceed the set rotational speed N as a result of the above speed increase control the relation "D (comparative value)=K*(Ns/N)<K" will result. This causes the difference E to have a positive value. If the difference E has a positive value and if the output signal P from the control gate 24 of the controller 20 has a value between 0 and Tm, the gate pulse adjuster 26c outputs a gate pulse at a dine of an x° phase (x°: a phase angle between the 0° phase and the 180° phase). Therefore, the switching element 26s is conductive during the period between the x° phase and the 180° phase. As a result, the power of the motor 11 is reduced from the maxim value. In other words, the motor 11 is controlled to decrease the speed from the actual speed N.

If the actual rotational speed N has increased due to the reduction of the load applied to the motor 11 or other factors, the difference E increases while maintaining the positive value. When the output signal P of the control gate 24 has reached the maximum value Tm, the gate pulse adjuster 26c outputs the gate pulse at a time of the 180° phase of the waveform of the power source voltage. As a result, the switching element 26 becomes non-conductive, so that the motor 11 supplies no power.

The difference E will be described further in connection with a high speed operation and a low speed operation of the motor 11. If the set rotational speed Ns is greater than the actual rotational speed N by 4% while the motor 11 rotates at a high speed, such as a speed of 500 rps (N=500), the set rotational speed Ns is 520 rps (Ns=N+0.04N=1.04N=520). As described previously, the comparative value D is calculated by the expression "D=K*(Ns/N)." Therefore, in this case, D=K*1.04. Because K=31250, the comparative value D is 32500. The difference E is therefore calculated by the expression "E=K−D=31250−32500=−1250." As a result, the output signal P from the control gate 24 has the minimum value of 0, so that the motor 11 is controlled to increase the speed from the actual rotational speed N.

On the other hand, if the set rotational speed Ns is greater than the actual rotational speed N by 4% while the motor 11 rotates at a low speed, such as a speed of 50 rps (N=50), the set rotational speed Ns is 52 rps (Ns=N+0.04N=1.04N=52). Because the comparative value D is calculated by the expression "D=K*(Ns/N)", "D=K*1.04" results. Because K=31250, the comparative value D is 32500. The difference E is therefore calculated as "B=K−D=31250−32500=−1250."

In this way, although the comparative value D may change in response to the difference in speed between the set rotational speed Ns and the actual rotational speed N, the comparative value D does not change depending on the actual rotational speed N. Therefore, the difference E always has a fixed value as long as the ratio of the set rotational speed Ns to the actual rotational speed N is constant.

According to the embodiments described above, the pulse interval T is determined by the pulse interval determining device 14 and the count number C corresponding to the pulse interval T (and proportional to 1/N) is directly used for the speed control of the motor 11. No calculation is made to obtain the rotational speed N of the motor 11 from the inverse value of the pulse interval T. Therefore, the calculation required for the speed control is simple and it is possible to perform the speed control by using a small-bit microcomputer, such as a 8-bit to 16-bit microcomputers.

In addition, according to the embodiments described above, the set value K is constant irrespective of change of the set rotational speed Ns over that range between a low speed value and a high speed value. Therefore, even if the rotational speed of the motor 11 has been changed from the low speed value to the high speed value, it is possible to perform the control substantially in a manner like a constant speed control. Further, the comparative value D changes with change in the speed difference ratio but does not change with the actual rotational speed N of the motor 11. Therefore, if the speed difference ratio does not change, the difference E has a constant value irrespective of change of the actual rotational speed N. As a result, it is possible to properly perform the speed control with the same accuracy over the range between the low speed and the high speed.

Further, because the operation device (the volume resister 16b in this embodiment) is provided for continuously changing the A/D converted value Nsc that corresponds to the set rotational speed Ns, it is possible to continuously vary the set rotational speed Ns between the minimum set speed and the maximum set speed.

The present invention may not be limited to the above embodiments but may be modified in various ways without departing from the sprit of the invention. For example, although the magnets 12m of the encoder 12 are arranged at an angular interval of 90°, the angular interval of the magnets 12m as well as the number of the magnets 12e can be changed as needed.

In addition, although the timer counter of the pulse determining device 14 is of a type having an oscillation period of 16 μs, any other type of timer counter can be used. Further, although the controller 20 sets the output signal P of the control gate 24 to have a value of 0 in the case that the difference E has a negative value or 0, the relation between the difference E and the output signal P of the control gate 24 can be easily determined depending on the type of a power tool to which a motor to be controlled is used.

The invention claimed is:

1. A motor speed control system comprising:
a pulse outputting device that outputs a pulse each time a motor rotates;
a pulse interval determining device that determines a pulse interval between the pulses outputted from the pulse outputting device;
a comparative value calculating device that obtains a comparative value as a product of a first value and a second value, the first value corresponding to the pulse interval determined by the pulse interval determining device, and the second value corresponding to a set rotational speed of the motor;
a set value calculating device that obtains a set value as a product of a third value and the second value, the third value corresponding to the pulse interval obtained when the motor rotates at the set rotational speed; and
a controller that controls a supply of power to the motor based on the comparative value and the set value such that a difference between the set value and the comparative value decreases.

2. The motor speed control system as in claim 1, further comprising an operation device that is operable to continuously change the second value.

3. The motor speed control system as in claim 1, wherein the controller includes an amplifier, a control gate and a motor driver.

4. The motor speed control system as in claim 3, wherein the amplifier creates a first output by enhancing a signal produced by the difference between the set value and the comparative value.

5. The motor speed control system as in claim 4, wherein the control gate restricts the first output from the amplifier, and further generates and sends a second output to the motor driver.

6. The motor speed control system as in claim 5, wherein the first value is an integer C representing an actual rotational speed N, the second value is a digital value Nsc representing the set rotational speed Ns, and the comparative value calculating device calculates a comparative value D by:

$$D = Nsc * C.$$

7. The motor control system as in claim 6, wherein the third value is an integer number representing the set rotational speed Ns, and the set value calculating device calculates a set value as a constant value K by:

$$K = Nsc * Cs.$$

8. A motor speed control system comprising:
a controller operable to increase or decrease a power supply to a motor, wherein the controller increases the supply of power when a difference in E is a negative value, the difference in E calculated by:

$$E = K(1 - Ns/N)$$

wherein K is a constant value, Ns is a set rotational speed, and N is an actual rotational speed, further wherein the controller decreases the supply of power when the difference in E is a positive value; and
a comparative value calculating device for calculating a comparative value D by:

$$D = Nsc * C$$

wherein Nsc is a digital value representing set rotational speed Ns, and C is an integer number representing the actual rotational speed N.

9. The motor speed control system as in claim 8, further comprising a set value calculating device for calculating a set value as the constant value K by:

$$K = Nsc * Cs$$

wherein Cs is an integer number representing the set rotational speed Ns, further wherein the difference in E is calculated by:

$$E = K - D = Nsc * Cs - Nsc * C.$$

10. The motor speed control system as in claim 9, further comprising a pulse interval outputting device for outputting pulses at an interval corresponding to the rotational speed of the motor, wherein the comparative value calculating device comprises a counter operable to count a number of pulses per unit time for obtaining a number of pulses as the integer number C.

11. The motor control system as in claim 10, wherein $C=(1/N)/t$ and $Cs=(1/Ns)/t$, $t$ being an oscillating period of the counter, because $Nsc = K/Cs$, the difference E is calculated by:

$$E=K-(K/Cs)*C=K-(K*Ns*t*(1/N*t))=K-K*(Ns/N)=K(1-Ns/N).$$

12. The motor speed control system as in claim 8, wherein the controller includes an amplifier, a control gate and a motor driver.

13. The motor speed control system as in claim 12, wherein the amplifier creates a first output by enhancing a signal produced by the difference E.

14. The motor speed control system as in claim 13, wherein the control gate restricts the first output from the amplifier, and further generates and sends a second output to the motor driver.

* * * * *